United States Patent [19]
Kumar et al.

[11] Patent Number: 5,507,857
[45] Date of Patent: Apr. 16, 1996

[54] PRESSURE SWING ADSORPTION PROCESS FOR FRACTIONATING A MULTI-COMPONENT MIXTURE

[75] Inventors: Ravi Kumar, Allentown, Pa.; Sidney S. Stern, Highland Park, N.J.

[73] Assignee: The BOC Group, Inc., New Providence, N.J.

[21] Appl. No.: 375,435

[22] Filed: Jan. 19, 1995

[51] Int. Cl.⁶ ............................................. B01D 53/047
[52] U.S. Cl. .................... 95/101; 95/143; 95/144
[58] Field of Search ........................... 95/95–105, 143, 95/144

[56] References Cited

U.S. PATENT DOCUMENTS

| | | | |
|---|---|---|---|
| 3,078,644 | 2/1963 | Milton | 95/144 |
| 3,619,984 | 11/1971 | Domine et al. | 95/103 |
| 3,788,037 | 1/1974 | Shell et al. | 95/99 |
| 3,977,845 | 8/1976 | Walter | 95/100 |
| 4,000,990 | 1/1977 | Bingham | 95/103 |
| 4,129,424 | 12/1978 | Armond | 95/98 |
| 4,153,428 | 5/1979 | Saunders et al. | 95/99 |
| 4,171,207 | 10/1979 | Sircar | 95/101 |
| 4,299,596 | 11/1981 | Benkmann | 95/100 |
| 4,376,639 | 3/1983 | Vo | 95/101 |
| 4,539,020 | 9/1985 | Sakuraya et al. | 95/101 |
| 4,790,858 | 12/1988 | Sircar | 95/101 |
| 4,812,147 | 3/1989 | BeVier | 95/95 |
| 4,813,980 | 3/1989 | Sircar | 95/101 |
| 4,913,709 | 4/1990 | Kumar | 95/100 |
| 4,914,218 | 4/1990 | Kumar et al. | 95/100 |
| 5,051,115 | 9/1991 | Leitgeb et al. | 95/101 |
| 5,133,785 | 7/1992 | Kumar et al. | 95/101 |
| 5,234,472 | 8/1993 | Krishnamurthy et al. | 95/143 X |
| 5,245,099 | 9/1993 | Mitariten | 585/650 |
| 5,248,322 | 9/1993 | Kumar | 95/101 |
| 5,330,561 | 7/1994 | Kumar et al. | 95/101 |
| 5,345,025 | 9/1994 | Mitariten et al. | 585/655 |
| 5,354,346 | 10/1994 | Kumar | 95/101 |
| 5,382,280 | 1/1995 | Choe et al. | 95/105 X |

*Primary Examiner*—Robert Spitzer
*Attorney, Agent, or Firm*—David M. Rosenblum; Larry R. Cassett

[57] ABSTRACT

A method of rectifying a multicomponent mixture by pressure swing adsorption to separate primary and secondary components of the mixture. Two groups of adsorbent beds are used in the method and adsorbent beds of the two groups are employed in a paired relationship and subjected to feed, co-current depressurization, evacuation, and countercurrent repressurization stages. In the feed stages, pairs of the adsorbent beds are pressurized with the mixture to adsorb the primary component in a first group of the adsorbent beds and in an entry section of a second group of the adsorbent beds. Also during the feed stage, the secondary component is adsorbed in the second group of adsorbent beds in remaining sections thereof. During co-current depressurization, any of the secondary component adsorbed in the first group of adsorbent beds and part of the primary component is driven to the second group of adsorbent beds. The adsorbent beds are individually evacuated to produce primary and secondary product streams rich in the primary and secondary components, respectively. Countercurrent repressurization is effected with a waste stream comprising the effluent from the feed stage. The countercurrent repressurization stage functions to bring the adsorbent beds back up to operating pressure and to drive the primary component back into the first group of adsorbent beds.

7 Claims, 5 Drawing Sheets

GROUP #1

| BED # | | | | | | | |
|---|---|---|---|---|---|---|---|
| 10 | FEED | CoC DP | C3H6 PURGE | EVACUATION | RP | EV- | |
| 20 | RP | FEED | EVACUATION | CoC DP | C3H6 PURGE | FEED | |
| 30 | -ACUATION | CoC DP | C3H6 PURGE | FEED | RP | | |

180 — 360 — 540

GROUP #2

| BED # | | | | | | | |
|---|---|---|---|---|---|---|---|
| 10A | RP | FEED | EVACUATION | PE (F) | RPI (F) | RP | |
| 20A | EVACUATION | PE (F) | RPI (F) | RP | FEED | EVACUATION | |
| 30A | FEED | EVACUATION | PE (F) | RPI (F) | RP | FEED | |

FIG. 3

GROUP # 1

| | | | | | | | BED # |
|---|---|---|---|---|---|---|---|
| FEED | F/F PE | C₃H₆ PURGE | CoC DP | EVACUATION | C₃H₆ PURGE | F/F PE | 10 |
| CoC DP | EVACUATION | FEED | CoC DP | RP | 20 |
| RP | EVACUATION | F/F PE | FEED | EVACU | 30 |

180 — 360 — 540

GROUP # 2

| | | | | | | | BED # |
|---|---|---|---|---|---|---|---|
| FEED | CoC DP | → | FEED | EVACUATION | CoC DP | RP | 10A |
| RP | F/F PE | EVACUATION | CoC DP | F/F PE | → | EV | 20A |
| -CUATION | CoC DP | F/F PE | → | FEED | EVACUATION | FEED | 30A |

GROUP # 1

| | | | | | | BED # |
|---|---|---|---|---|---|---|
| FEED | F/F PE | EVACUATION | CoC DP | EVACUATION | F/F PE | RP | 10 |
| | | | | | | |
| -TION | RP | FEED | CoC DP | FEED | EVACUA | 20 |
| CoC DP | EVACUATION | F/F PE | RP | FEED | 30 |

180 — 360 — 540

GROUP # 2

| | | | | | | BED # |
|---|---|---|---|---|---|---|
| FEED | RP | EVACUATION | F/F PE | EVACUATION | RP | 10A |
| CUATION | F/F PE | FEED | CoC DP | FEED | F/F PE | EVA | 20A |
| CoC DP | RP | EVACUATION | FEED | 30A |

FIG. 5

GROUP # 1

| BED # | | | | |
|---|---|---|---|---|
| 10 | FEED | RP | EVACUATION | RP |
| 20 | CoC DP | FEED | RP | EVACUA- |
| 30 | EVACUATION | CoC DP | FEED | -TION CoC DP |

180 — 360 — 540

GROUP # 2

| BED # | | | | |
|---|---|---|---|---|
| 10A | FEED | RP | EVACUATION | PE (F) RP |
| 20A | PE (F) | FEED | RP | EVACUATION |
| 30A | EVACUATION | PE (F) | FEED | |

PRESSURE SWING ADSORPTION PROCESS FOR FRACTIONATING A MULTI-COMPONENT MIXTURE

BACKGROUND OF THE INVENTION

The present invention relates to a pressure swing adsorption process for fractionating a multi-component mixture in which two groups of first and second adsorbent beds are employed to produce product streams enriched in individual components of the multi-component mixture. More particularly, the present invention relates to such a pressure swing adsorption process in which the first group of adsorbent beds contain an adsorbent to preferentially adsorb a first of the components and the second group of adsorbent beds have an entry section containing the adsorbent of the first group of adsorbent beds and another adsorbent, situated downstream of the entry section, to preferentially adsorb a second of the components. Even more particularly, the present invention relates to such a pressure swing adsorption process that is conducted in accordance with a cycle in which the first component adsorbed within the adsorbent contained within the entry section of the second group of adsorbent beds is driven back to the first group of adsorbent beds in order to increase recovery of the first component.

The Prior Art has provided pressure swing adsorption systems that utilize groups of adsorbent beds to fractionate a multi-component mixture. An example can be found in U.S. Pat. No. 4,790,858, in which a multi-component gas mixture containing hydrogen as a primary component, a secondary component and minor quantity of one or more dilute components is adsorbed in three groups of adsorbent beds to produce a purified hydrogen product. In this patent, the secondary component, which consists of carbon dioxide, is adsorbed in a first group of adsorbent beds and the minor dilute components are adsorbed in a second group of adsorbent beds. This permits the recovery of unadsorbed high purity hydrogen. The adsorbent beds of the second group are thereafter depressurized and purged with the high purity hydrogen to produce an effluent containing the hydrogen and desorbed minor dilute components. The effluent is passed through the third group of adsorbent beds that are designed to preferentially adsorb the minor dilute components to produce a further amount of the high purity hydrogen. In a preferred embodiment, the second group of adsorbent beds have entry sections provided with an adsorbent designed to more preferentially adsorb the secondary component to thereby adsorb any of the secondary component not adsorbed in the first group of adsorbent beds. During a countercurrent desorption stage, the second group of adsorbent beds is depressurized so that the secondary component previously adsorbed in the entry section of the second group of adsorbent beds is introduced into the first group of adsorbent beds in a direction co-current to the initial feed to adsorb more of the secondary component within the first adsorbent bed.

As will be discussed, the present invention provides a process for fractionating a multi-component mixture to produce a primary component at high purity and which utilizes two groups of adsorbent beds. The two groups of adsorbent beds are operated in accordance with the cycle to produce the primary component at higher recovery rates than prior art processes utilizing groups of adsorbent beds for such purposes.

SUMMARY OF THE INVENTION

The present invention relates to a process of fractionating a multi-component mixture. In accordance with the process, first and second adsorbent beds, in a paired relationship, are subjected to a continuous cycle having sequential feed, co-current depressurization, evacuation, and countercurrent repressurization stages. The first and second adsorbent beds have opposed entry and discharge sections through which the multi-component mixture passes into and is discharged from the first and second adsorbent beds. The first adsorbent beds contain a first adsorbent selected to preferentially adsorb a primary component of the multi-component mixture and the second adsorbent beds contain the first adsorbent in the entry sections thereof and a second adsorbent selected to more preferentially adsorb the secondary component. The second adsorbent is located downstream from the entry sections.

The feed stages are conducted by feeding the first and second adsorbent beds with the multi-component mixture so that the primary component adsorbs within the first adsorbent and the secondary component adsorbs within the second adsorbent and to a lesser extent adsorbs within the first adsorbent to produce a waste stream discharged from the discharge sections of the second adsorbent beds.

The co-current depressurization stages are effectuated by depressurizing the first adsorbent beds through the second adsorbent beds to drive the secondary component from the first adsorbent contained within the first adsorbent beds to the second adsorbent beds and also, thereby driving part of the primary component adsorbed within the first adsorbent of the first adsorbent beds to the first adsorbent contained within the entry sections of the second adsorbent beds. The evacuation stages are conducted by evacuating each of the first and second adsorbent beds to produce a primary product stream enriched in the primary product and a secondary product stream enriched in the secondary component, respectively.

In the countercurrent repressurization stages, the first and second adsorbent beds are countercurrently repressurized with the waste stream. As a result, the first and second adsorbent beds pressurize. The concentration of primary and secondary components contained within the waste stream adsorb in the second and first adsorbents. Additionally, repressurization drives the primary component, previously adsorbed within the first adsorbent contained within the entry section of the second adsorbent beds, back to the first adsorbent contained within the first adsorbent beds.

As stated above, the method is conducted by subjecting first and second adsorbent beds in a paired relationship. The term "paired relationship" as used herein and in the claims means that pairs of first and second adsorbent beds are subjected to each of the stages of the cycle. The same pairs are not necessarily subjected to each stage of the cycle and different pairs of adsorbent beds may be subjected to different stages of the cycle. For instance, the pairs of adsorbent beds that are connected in a feed stage may not be the same pairs of adsorbent beds that are connected during effectuation of a co-current depressurization stage. Additionally the term "co-current" as used herein and in the claims means a direction taken from an entry to discharge section and the term "countercurrent" as used herein and in the claims means a direction taken from discharge to entry sections or the reverse of "co-current".

The present invention operates to separate the primary component and to produce a product stream containing the primary component at a high purity. This is accomplished by the sequence of feeding the adsorbent beds so that part of the primary component not adsorbed within the first adsorbent bed is at least caught in the entry sections of the second adsorbent bed and then subjecting the adsorbent beds to co-current depressurization to drive any of the secondary component adsorbed within the first group of adsorbent beds into the second group of adsorbent beds while, again, catching any of the primary component that desorbs from the first group of adsorbent beds in the entry sections of the second group of adsorbent beds. These two operations increase the purity of the product stream that is formed by evacuation of the first group of adsorbent beds. The potentially valuable primary component that has adsorbed within the entry sections of the second group of adsorbent beds is recovered in the adsorbent of the first group of adsorbent beds during countercurrent repressurization to produce the primary component in the product stream at high recovery rates.

BRIEF DESCRIPTION OF THE DRAWINGS

While the specification concludes with claims distinctly pointing out the subject matter that Applicants regard as their invention, it is believed that the invention will be better understood when taken in conjunction with the accompanying drawings in which:

Figure 1:
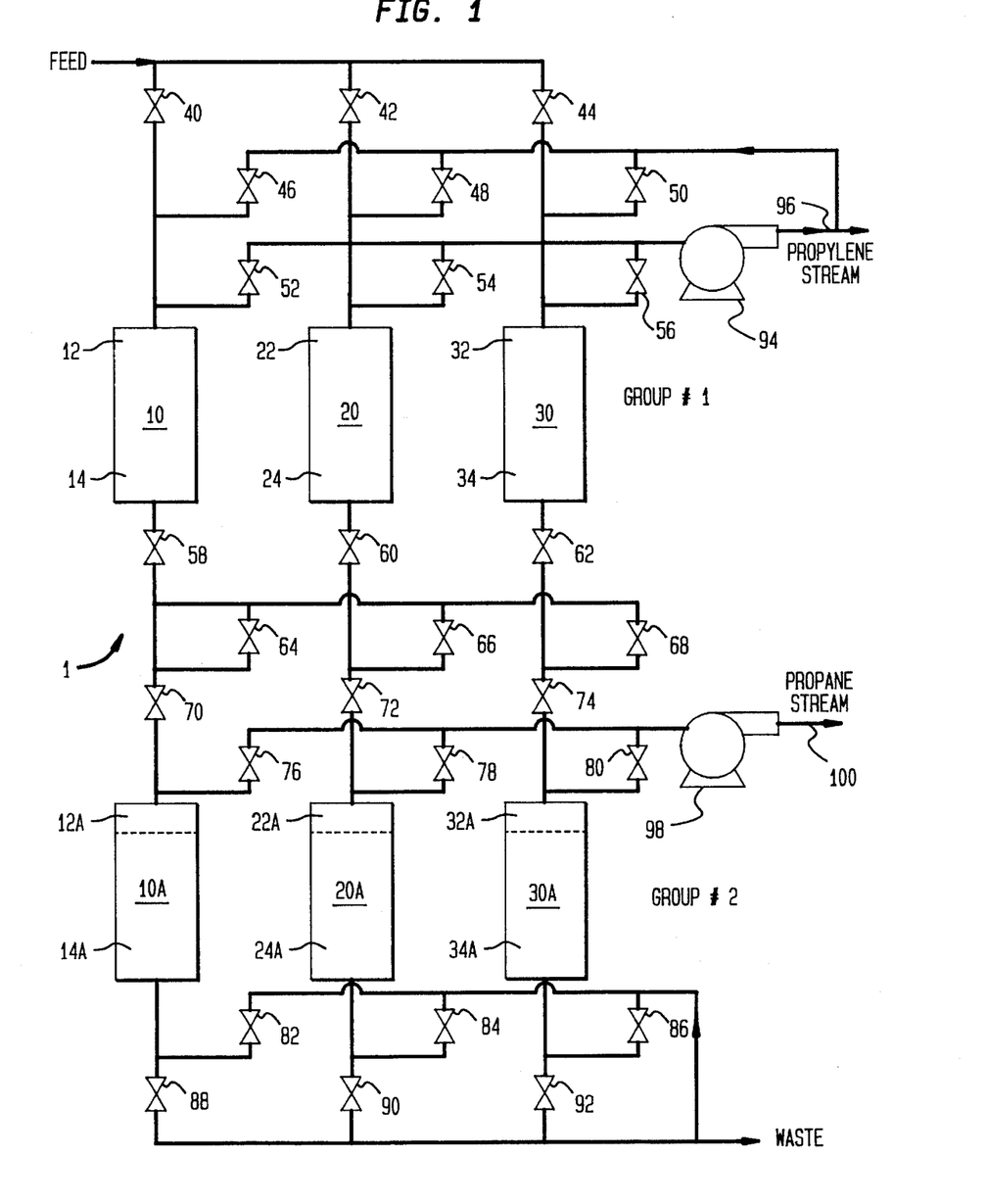
FIG. 1 is a schematic view of an apparatus for carrying out a method in accordance with the present invention.

preferentially adsorb propylene over the other components of the multi-component mixture. A suitable adsorbent for this task is Zeolite 4A. First adsorbent beds are provided with entry and discharge sections or ends 12 and 14 for first adsorbent bed 10; 22 and 24 for first adsorbent bed 20; and 32 and 34 for first adsorbent bed 30. The second group of adsorbent beds, namely, second adsorbent beds 10A, 20A, and 30A are provided with respective entry and discharge sections or ends 12A and 14A for second adsorbent bed 10A; 22A and 24A for second adsorbent bed 20A; and 32A and 34A for second adsorbent bed 30A. Entry sections 12A, 22A, and 32A of respective second adsorbent beds 10A, 20A and 30A contain the same first adsorbent as that within first adsorbent beds 10, 20, and 30. The remaining portions of second adsorbent beds 10A, 20A, and 30A (situated directly downstream of entry sections 12A, 22A, and 32A) contain a second adsorbent to preferentially adsorb propane over the other components of the multi-component mixture. A suitable adsorbent for such purpose is SG or Zeolite 13X. In the Figs. the dashed lines indicate the division of adsorbent beds 10A, 20A, and 30A into two adsorbents.

The flow throughout apparatus 1 is controlled by remotely actuated on-off valves referenced in the valve sequence chart set forth below. Although not illustrated, operational control of such on-off valves can be effectuated by a digital control system, known in the Art.

Figure 2:
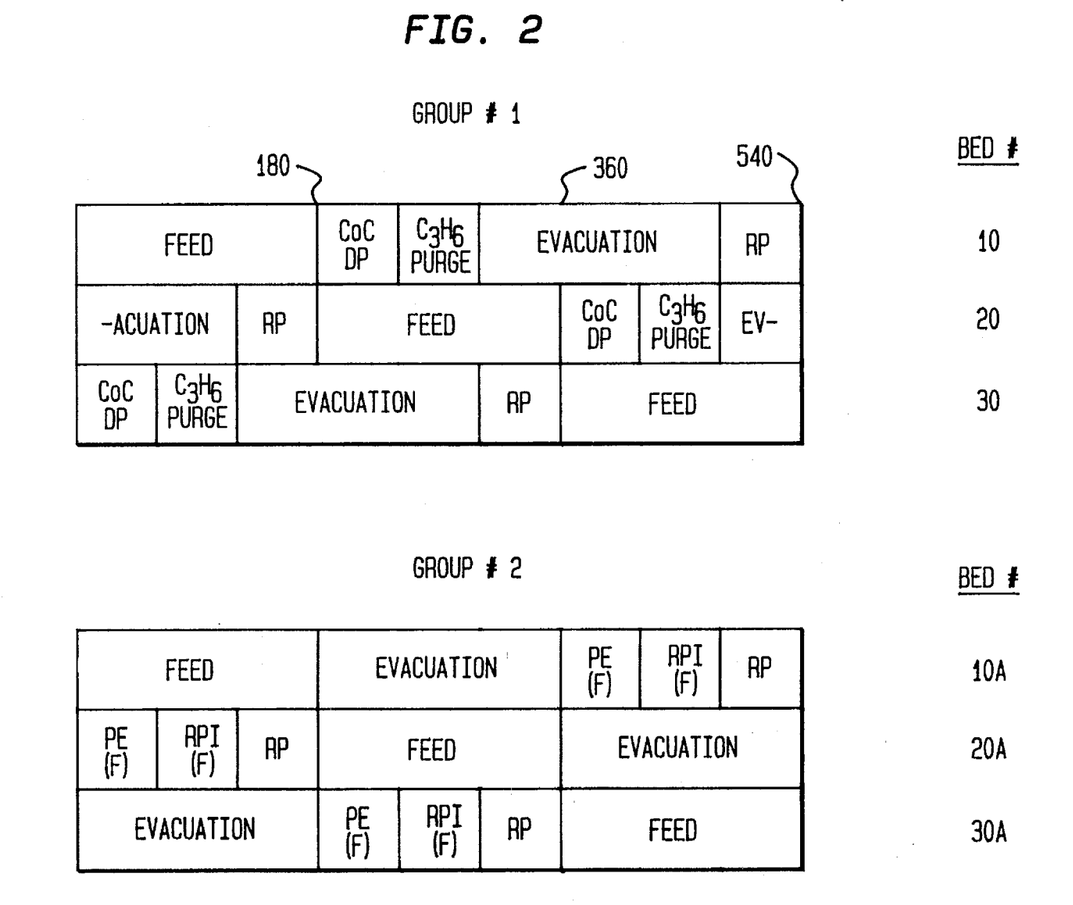
FIG. 2 is an operational schematic of a method in accordance with the present invention.

With additional reference to FIG. 2 and the following valve sequence chart, a sequence of operation for apparatus 1 is illustrated. It is to be noted that in the following chart, the symbol "O" indicates that a valve is in an open position. If not otherwise indicated, the valve is in a closed position.

VALVE SEQUENCE

| Time (Sec.) | 40 | 42 | 44 | 46 | 48 | 50 | 52 | 54 | 56 | 58 | 60 | 62 | 64 | 66 | 68 | 70 | 72 | 74 | 76 | 78 | 80 | 82 | 84 | 86 | 88 | 90 | 92 |
|---|---|---|---|---|---|---|---|---|---|---|---|---|---|---|---|---|---|---|---|---|---|---|---|---|---|---|---|
| 0–60 | O | | | | | | | O | | O | | O | | O | O | O | O | | | | O | | | | O | | |
| 60–120 | O | | | | O | | O | | | O | | O | | O | O | O | O | | | | O | | | | O | | |
| 120–180 | O | | | | | | | | O | O | O | | | | | O | O | | | | O | | O | | O | | |
| 180–240 | | O | | | | | | | O | O | O | | O | | O | | O | O | O | | | | | | | O | |
| 240–300 | | O | | O | | | | | O | O | O | | O | | O | | O | O | O | | | | | | | O | |
| 300–360 | | O | | | | O | | | | O | O | | | | | O | O | O | | | | | O | O | | | |
| 360–420 | | | O | | | | | O | | | O | O | O | O | | O | | O | | O | | | | | | | O |
| 420–480 | | | O | | O | | O | | | | O | O | O | O | | O | | O | | O | | | | | | | O |
| 480–540 | | | O | | | | | | O | | | O | | | | O | | O | | O | | O | | | | | O |

In each of FIGS. 2–5, the duration of each stage defined by a square is 60 seconds and thus, each stage defined by a rectangle has a total duration of 180 seconds.

DETAILED DESCRIPTION OF THE DRAWINGS

With reference to FIG. 1, an apparatus 1 in accordance with the present invention is illustrated. Apparatus 1 consists of two groups of adsorbent beds acting in concert to rectify a multi-component mixture comprising hydrogen, propylene, and propane and to produce primary and secondary product streams. The primary product stream is a high purity propylene stream and the secondary product stream is a propane stream of lower purity than the high purity primary product stream. It is understood however, that the present invention has equal applicability to the rectification of other multi-component mixtures.

The first group of adsorbent beds, namely first adsorbent beds 10, 20, and 30 contain a first adsorbent designed to During the first time interval (0–60 seconds) valves 40, 58, 70 and 88 are open. In this configuration of apparatus 1, first and second adsorbent beds 10 and 10A are subjected to a feed stage designated in FIG. 2 as "FEED". In the feed stage, the particular bed involved is fed with the multicomponent mixture at pressure. To this end, first and second adsorbent beds 10 and 10A are connected in series so that the multi-component mixture feeds the first adsorbent bed 10 (where propylene and to a lesser extent propane are adsorbed) and then entry section 12A of second adsorbent bed 10A where any propylene not adsorbed in first adsorbent bed 10 is adsorbed. Propane is adsorbed in the remainder of second adsorbent bed 10A to produce a waste stream which is discharged from second adsorbent bed 10A. During this first time interval, valve 54 is open while valve 60 is closed. A vacuum pump 94 subjects first adsorbent bed 20 to sub-atmosphere pressure in "Evacuation Stage" (see FIG. 2) to produce a propylene product stream 96.

In the first 0–60 second time interval, valves 62, 68, 66 and 72 are open while valves 90 and 84 are closed. This subjects first and second adsorbent beds 30 and 20A to a co-current depressurization stage ("CoCDP") for bed 30 and ("PE(F)") for bed 20 A). The notation "PE (F)" is used became bed 20A, prior to the co-current depressurization stage was subjected to an evacuation stage. As such, the resultant low pressure of second bed 20A drives this particular co-current depressurization stage and as far as it is concerned it is seeing a pressure equalization from the feed end and hence, the notation "PE (F)". First adsorbent bed 30, which previously was subjected to the feed stage, is in a pressurized state and hence, first adsorbent bed 30 depressurizes through second adsorbent bed 20A. The co-current depressurization stage causes any of the secondary component adsorbed within first adsorbent bed 30 and part of the primary component to desorb from first adsorbent bed 30 and to flow into second adsorbent bed 20A. The desorbed propylene is adsorbed within entry section 22A of second adsorbent bed 20A and the desorbed propane is adsorbed within the remainder of second adsorbent bed 20A. As mentioned above, this action increases the purity of propylene adsorbed within first adsorbent bed 30.

During this first sixty second time interval of operation, valves 86 and 92 are closed while valve 80 is opened. This allows an evacuation of second adsorbent bed 0A by means of vacuum pump 98 to produce a secondary product stream 100 enriched in propane.

In the next time interval, 60 to 120 seconds, first adsorbent beds 10 and 10A are still being subjected to the feed stage and adsorbent beds 20 and 30A are undergoing the evacuation stage to produce product streams. As indicated in the chart, valve 50 is open to came part of the primary product stream 96 to flow into first adsorbent bed 30 to increase the propylene purity of adsorbent bed 30. At the same time, second adsorbent bed 20A is being subjected to an initial countercurrent repressurization with the effluent from first adsorbent bed 30, again adsorbing any unadsorbed propylene within entry section 22A. The remainder of second adsorbent bed 20A is adsorbing any propane being desorbed from first adsorbent bed 30. This stage of the process is known as a product purge stage and is designated in FIG. 2 as "$C_3 H_6$ Purge". Since adsorbent bed 20A is being subjected to an initial countercurrent repressurization it is given the notation "RPI (F)" for this stage of the cycle.

In the subsequent time interval, 120 to 180 seconds, first and second adsorbent beds 10 and 10A are still being subjected to the feed stage. First adsorbent bed 20 and second adsorbent bed 20A are now being subjected to a countercurrent repressurization stage with part of the waste stream. Valves 84, 72 and 60 are open for such purpose. The countercurrent repressurization stage causes propylene adsorbed within entry section 22A to flow back to first adsorbent bed 20 and to be adsorbed within the first adsorbent contained within first adsorbent bed 20. Valve 56 opens to allow first adsorbent bed 30 to be subjected to an evacuation stage by vacuum pump 94. Second adsorbent bed 30A continues to be subjected to the evacuation stage.

During the succeeding time interval of 180 to 240 seconds, first adsorbent bed 10 is paired with second adsorbent bed 30A to undergo a co-current depressurization stage of the process. First and second adsorbent beds 20 and 20A continue to be paired in the feed stage of the process and first and second adsorbent beds 30 and 10A are being evacuated by vacuum pumps 94 and 98 to subject each of them to the evacuation stage.

In the 240 to 300 second interval, first and second adsorbent beds 10 and 30A remain paired to undergo a product purge stage with propylene. Adsorbent beds 20 and 20A continue to be subjected to the feed stage and each of adsorbent beds 30 and 10A continue to be subjected to evacuation.

During the next sixty second time interval, 300 to 360 seconds, first and second adsorbent beds 10 and 10A are now the producing pair of adsorbent beds and are subjected to the evacuation stage by vacuum pumps 94 and 98 to produce product streams rich in propylene and propane, respectively. First and second adsorbent beds 20 and 20A continue to be fed, while second and first adsorbent beds 30A and 30 are subjected to the countercurrent repressurization stage by me of a part of the waste stream.

At the next part of the cycle, from 360 to 420 seconds, first adsorbent bed 10 continues to be a producing adsorbent bed, while second adsorbent bed 20A now becomes a producing adsorbent bed. As such, first and second adsorbent beds 10 and 20A are subjected to the evacuation stage. At the same time, first and second adsorbent beds 20 and 10A are subjected to the co-current depressurization stage while first and second adsorbent beds 30 and 30A are paired for the feed stage.

After the elapse of the next minute of the cycle, 420 to 480 seconds, first and second adsorbent beds 10 and 20A continue to be subjected to evacuation. First and second adsorbent beds 20 and 10A are subjected to the purge stage and first and second adsorbent beds 30 and 30A continue to be subjected to the feed stage.

During the final time period of between 480 and 540 seconds, first and second adsorbent beds 10 and 10A are repressurized with a portion of the waste stream and are thus subjected to the countercurrent repressurization stage. First and second adsorbent beds 20 and 20A are paired and subjected to the evacuation stage while first and second adsorbent beds 30 and 30A continue to be subjected to the feed stage.

After the elapse of 540 seconds, the cycle repeats itself. As can be seen, each of the first adsorbent beds is paired with a second adsorbent bed and subjected to the feed, co-current depressurization, product purge, evacuation, and countercurrent repressurization stages. As is evident from the above discussion a pair of first and second adsorbent beds (10 and 10A; 20 and 20A; 30 and 30A) are subjected to the countercurrent repressurization and then the feed stages of the cycle. While a first pair of the first and second adsorbent beds are subjected to the feed stage, second and third pairs of the first and second adsorbent beds are subjected to the evacuation and co-current depressurization stages. For instance, first and second adsorbent beds 10 and 10A are subjected to the feed stage while first and second adsorbent beds 30 and 20A are subjected to co-current depressurization and first and second adsorbent beds 20 and 30A are subjected to evacuation. Thereafter first and second adsorbent beds 30 and 20A are also subjected to the product purge stage with part of the primary product stream highly enriched in propylene.

Figure 3:
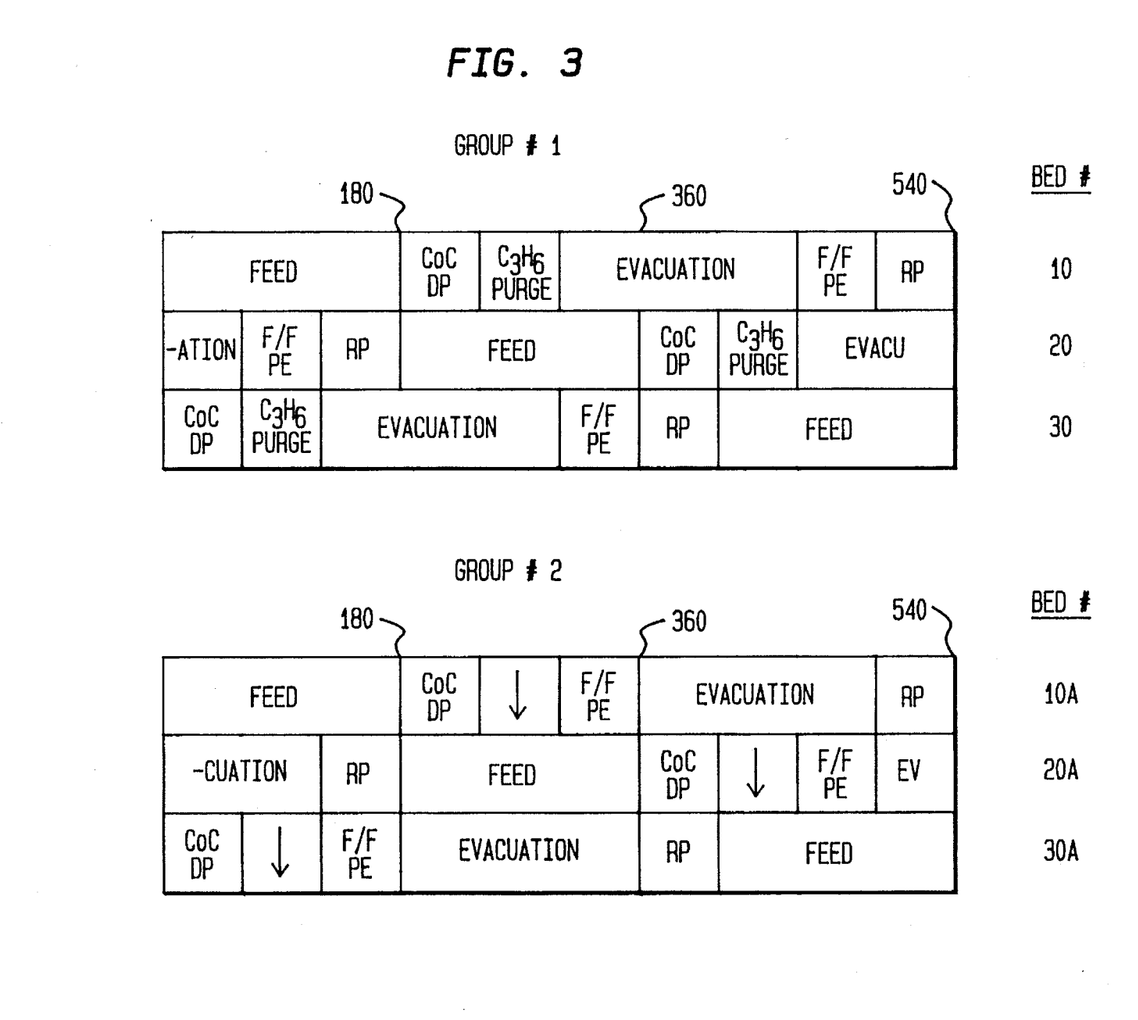
FIG. 3 is an alternative operational schematic of a method in accordance with the present invention.

With reference to FIG. 3, an alternative embodiment is illustrated in which the adsorbent beds cycle within feed, co-current depressurization, product purge, evacuation, pressure equalization, and countercurrent repressurization stages. This is distinguished from the foregoing cycle by the addition of a feed end to feed end pressure equalization stage designated in FIG. 3 as "F/F PE". For instance, at time period 420 to 480 seconds, first and second adsorbent beds 10 and 20A are paired, entry section 12 to entry section 22A, and are pressure equalized. Just prior to this stage, adsorbent bed 10 was subjected to the evacuation stage and is therefore at low pressure and adsorbent bed 20A has either been pressurized with waste or has been idle after having been subjected to co-current depressurization from the higher pressure adsorbent bed. The possible alternate stages are designated in FIG. 3 as "↓". The effect of the pressure equalization stage is to cause propylene adsorbed in entry section 22A of adsorbent bed 20A to flow back to adsorbent bed 10 for adsorption. Alternatively, although not illustrated, second adsorbent bed 20A could be paired with first adsorbent bed 20 for a product purge stage or be repressurized with waste. In case of repressurization, the effluent from first adsorbent bed 20 undergoing the product purge stage would also go to waste.

Figure 4:
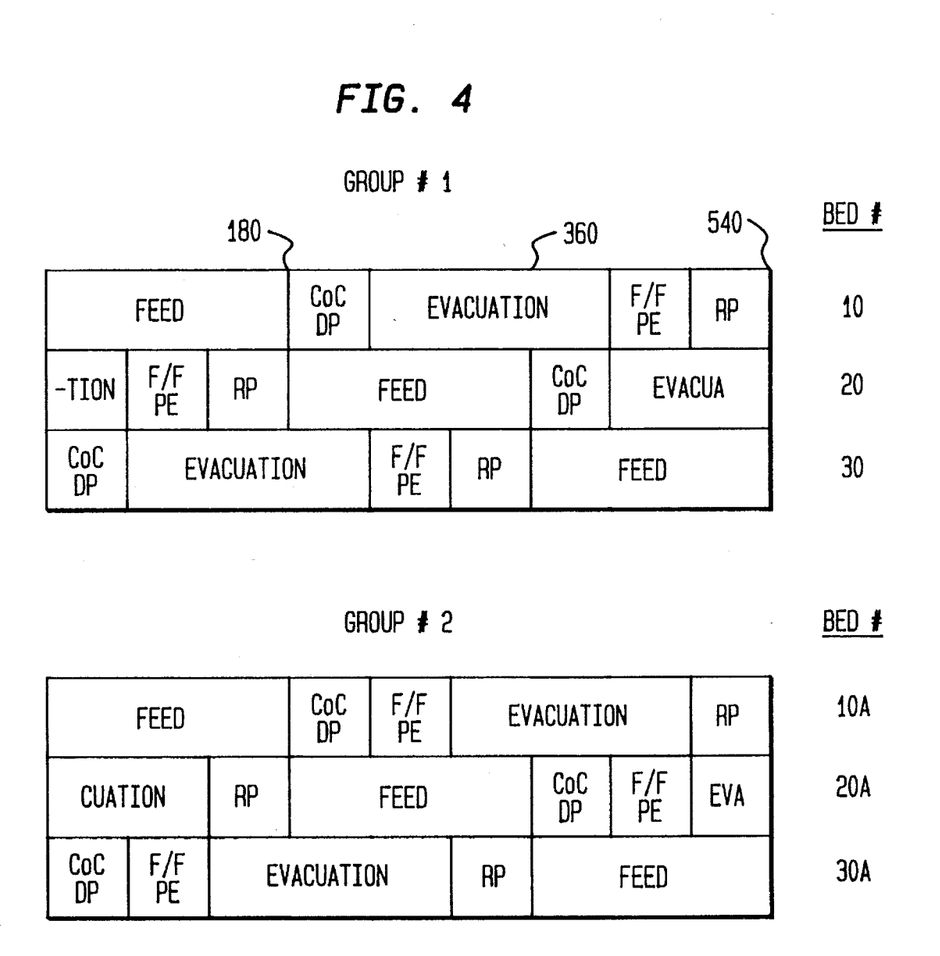
FIG. 4 is another alternative operational schematic of a method in accordance with the present invention.

With reference to FIG. 4, a still further embodiment of a method in accordance with the present invention is illustrated. This embodiment does not incorporate a product purge stage but does have a feed end to feed end pressure equalization stage. As illustrated, each of the adsorbent beds is subjected to a feed stage, a co-current depressurization stage, an evacuation stage, a feed end to feed end pressure equalization stage and then a countercurrent repressurization stage with waste. For instance, adsorbent beds 10 and 10A are subjected to the feed stage while adsorbent beds 20 and 20A are being evacuated and first and second adsorbent beds 30 and 30A undergo co-current depressurization. In the next time interval, first and second adsorbent beds 20 and 30A are connected feed end to feed end and are pressure equalized to discharge propylene from entry section 32A of second adsorbent bed 30A to first adsorbent bed 20. Thereafter, first and second adsorbent beds 20 and 20A are repressurized with a portion of the waste stream. At the same time, second adsorbent bed 30A is evacuated to produce a propane rich product stream.

Figure 5:
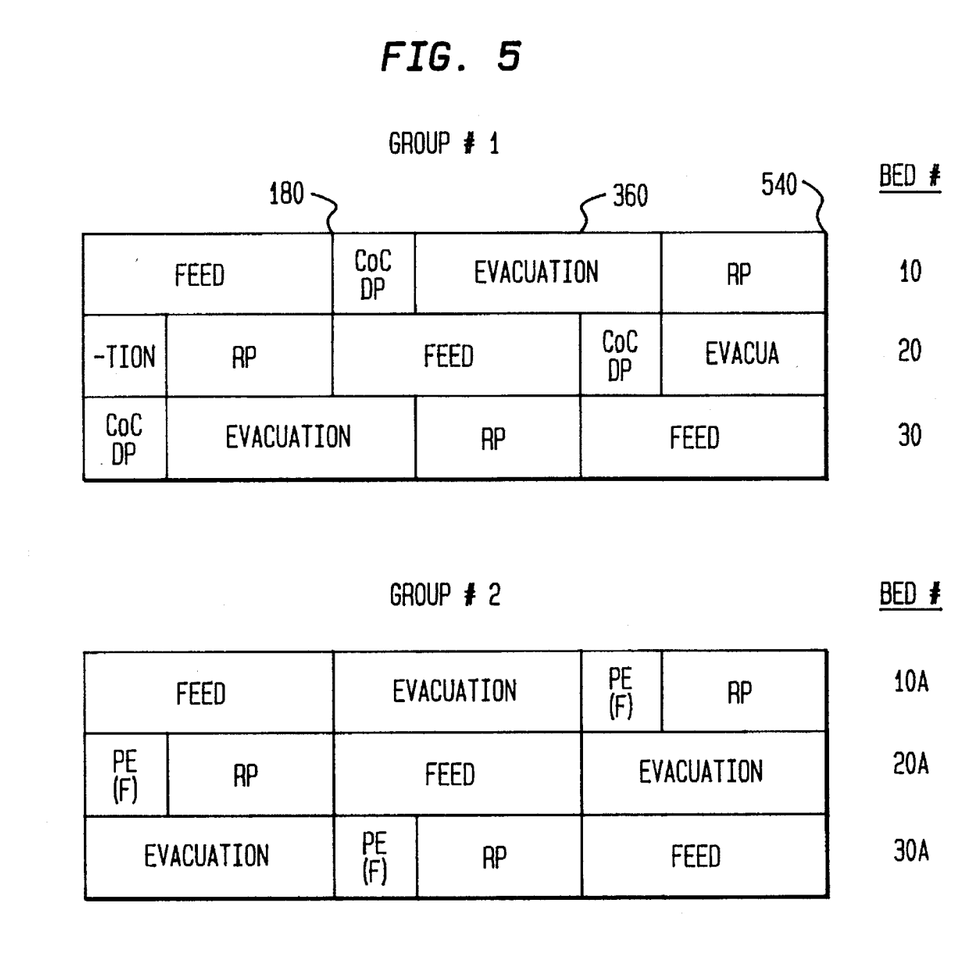
FIG. 5 is yet still another alternative operational schematic of a method in accordance with the present invention.

With reference to FIG. 5, a still further embodiment is illustrated which differs from the aforementioned embodiment in that it doesn't have a feed end to feed end pressure equalization stage. Thus, each adsorbent bed is subjected to feed, co-current depressurization, evacuation and countercurrent repressurization stages. For instance, first adsorbent bed 10 undergoes a feed stage and then undergoes a co-current depressurization stage through second adsorbent bed 30A. Thereafter first adsorbent bed 10 is a producing adsorbent bed and undergoes an evacuation stage. At the conclusion of the evacuation stage, first adsorbent bed 10 undergoes a countercurrent repressurization stage with effluent from second adsorbent bed 30A which is being fed back to second adsorbent bed 10A and then back to first adsorbent bed 10.

While the invention has been discussed with reference to a preferred embodiment, as will be understood by those skilled in the art, numerous changes, omissions and additions can be made without departing from the spirit and scope of the present invention.

We claim:

1. A pressure swing adsorption process for fractionating a multi-component mixture, said process comprising:

subjecting first and second adsorbent beds in a paired relationship to a continuous cycle having sequential feed, co-current depressurization, evacuation, and countercurrent repressurization stages;

said first and second adsorbent beds having opposed entry and discharge sections through which said multi-component mixture passes into and is discharged from said first and second adsorbent beds, said first adsorbent beds containing a first adsorbent selected to preferentially adsorb a primary component of said multi-component mixture and said second adsorbent beds containing said first adsorbent in said entry sections thereof and a second adsorbent, selected to preferentially adsorb a secondary component of said multi-component mixture, said second adsorbent located downstream from said entry sections;

said feed stage being conducted by feeding said first and second adsorbent beds with said multi-component mixture so that said primary component adsorbs within said first adsorbent and said secondary component adsorbs within said second adsorbent and to a lesser extent adsorbs within said first adsorbent to produce a waste stream discharged from said discharge sections of said second adsorbent beds;

said co-current depressurization stages being conducted by depressurizing said first adsorbent beds through said second adsorbent beds to drive said secondary component from said first adsorbent contained within said first adsorbent beds to said second adsorbent beds and also, thereby driving part of the primary component adsorbed within said first adsorbent of said first adsorbent bed to said first adsorbent contained within said entry sections of said second adsorbent beds;

said evacuation stages being conducted by evacuating each of said first and second adsorbent beds to produce a primary product stream enriched in said primary component and a secondary product stream enriched in said secondary component, respectively; and said countercurrent repressurization stages being conducted by countercurrently repressurizing said first and second adsorbent beds with said waste stream so that said first and second adsorbent beds repressurize, a concentration of primary and secondary components contained within said waste stream adsorb in said second and first adsorbents, and said primary component contained within said first adsorbent of said entry sections of said second adsorbent beds is driven back to said first adsorbent contained within said first adsorbent beds.

2. The method of claim 1, further comprising a purge stage situated between said co-current depressurization and evacuation stage, said purge stage comprising introducing a subsidiary product stream formed from part of said primary product stream into each pair of first and second adsorbent beds after having just undergone the feed stage to increase amount of adsorption of said primary component by said first adsorbent.

3. The method of claim 2, further comprising subjecting each of said first adsorbent beds to a pressure equalization stage after said evacuation stage by pressure equalizing each of said first adsorbent beds with a said second adsorbent bed just prior to subjugation of said adsorbent bed to said evacuation stage.

4. The method of claim 2, wherein:

a first pair and second adsorbent beds is subjected to said countercurrent repressurization and then said feed stages;

while said pair of first and second adsorbent beds is subjected to said feed stage, second and third pairs of said first and second adsorbent beds subject to said evacuation and co-current depressurization stages; and after completion of said co-current depressurization stage and while said first and second adsorbent beds are subjected to said feed and evacuation stages, said third pair of first and second adsorbent beds are subjected to said purge stage.

5. The method of claim 4, wherein said multi-component mixture comprises hydrogen, propylene and propane, said primary component comprises propylene and said secondary component comprises propane.

6. The method of claim 1, wherein after each of said first adsorbent beds is subjected to said evacuation stage, each of said first adsorbent beds are also subjected to a pressure equalization stage with a said second adsorbent bed which has just completed said co-current depressurization stage so that each of said first adsorbent beds are connected to the said second adsorbent bed by their said entry sections and said primary component adsorbed within said first adsorbent containing within said entry section of the said second adsorbent bed is driven into said first adsorbent contained within said first adsorbent bed.

7. The method of claim 1, wherein said co-current depressurization stage is conducted by depressurizing each of said adsorbent beds through a said second adsorbent bed that has just been evacuated.

* * * * *